United States Patent

[11] 3,624,372

[72] Inventors Alexander Schroder Philip; John Richard Francis, both of Liverpool, England

[21] Appl. No. 11,760
[22] Filed Feb. 16, 1970
[45] Patented Nov. 30, 1971
[73] Assignee Automatic Telephone & Electric Company Limited Liverpool, England
[32] Priority Feb. 17, 1969
[33] Great Britain
[31] 8,472/69

[54] CHECKING AND FAULT-INDICATING ARRANGEMENTS
6 Claims, 2 Drawing Figs.

[52] U.S. Cl. .......... 235/153, 340/146.1, 340/172.5, 340/149
[51] Int. Cl. .......... G06f 11/08, G06f 11/04, G06f 11/00
[50] Field of Search .......... 235/153; 340/146.1, 172.5, 149

[56] References Cited

UNITED STATES PATENTS

| | | | |
|---|---|---|---|
| 3,409,879 | 11/1968 | Keister | 340/172.5 |
| 3,471,686 | 10/1969 | Connell | 235/153 |
| 2,950,464 | 8/1960 | Hinton et al. | 340/146.1 X |
| 3,252,149 | 5/1966 | Weida et al. | 340/172.5 |
| 3,312,954 | 4/1967 | Bible et al. | 340/172.5 |

*Primary Examiner*—Malcolm A. Morrison
*Assistant Examiner*—James F. Gottman
*Attorney*—Young & Thompson

ABSTRACT: A checking and fault-indicating arrangement is provided for four or a larger even number of processors in a data processing system. During a first predetermined period, odd-numbered processors perform a processing operation and the input date applied to one of the odd-numbered processors is also applied to a particular one of the adjacent even-numbered processors and the output of the two processors is compared in a comparator which provides a significant output if one of the processors are faulty. During a second predetermined period, even-numbered processors perform a processing operation and the input data applied to the other adjacent one of the even-numbered processors is also applied to said one odd-numbered processor and the output of the two processors is compared in a second comparator which also provides a significant output if one of the processors is faulty. The significant outputs of the two comparators are applied to an indicating arrangement which indicates the faulty processor.

INVENTORS
ALEXANDER SHRODER PHILIP
JOHN RICHARD FRANCIS
By Young & Thompson
ATTYS.

INVENTORS
ALEXANDER SHRODER PHILIP
JOHN RICHARD FRANCIS
BY Young + Thompson
ATTYS.

CHECKING AND FAULT-INDICATING ARRANGEMENTS

The present invention relates to checking and fault-indicating arrangements in particular to arrangements for checking the functioning of arrangements for processing data and also for indicating the identity of any processing arrangement of a plurality of processing arrangements that is malfunctioning if such a condition should manifest itself in any of the processing arrangements.

A disadvantage in the provision of checking and fault-indication arrangements for processing arrangements of the type mentioned is that hitherto rather a large amount of logic circuitry has been required for this purpose.

It is therefore an object of this invention to overcome the beforementioned disadvantage in a simple and inexpensive manner.

According to the invention, in a checking and fault-indicating arrangement associated with an even number of processors, at least four in a data processing arrangement, the processors are formed into two equal groups and during a first predetermined period the processors of the first group each perform a processing operation and the data applied for processing to a processor of the first group is also applied to a particular processor of the second group while during a second predetermined period the processors of the second group each perform a processing operation and the data applied for processing to another processor of the second group is also applied to said processor of the first group and the outputs of said processor of the first group and said particular processor of the second group are each fed to a first comparator individual to the two processors whereas the outputs of said other processor of the second group and said processor of the first group are each fed to a second comparator individual to the two processors whereby if said processor of the first group is faulty the outputs of said processor of the first group and said particular processor of the second group will differ and a significant output will be obtained from said first comparator during said first period and the outputs of said other processor of the second group and said processor of the first group will differ and significant output will be obtained from said second comparator during said second period, the faulty processor being identified by an indicating arrangement to which the significant outputs of the two comparators are applied.

Figure 1:
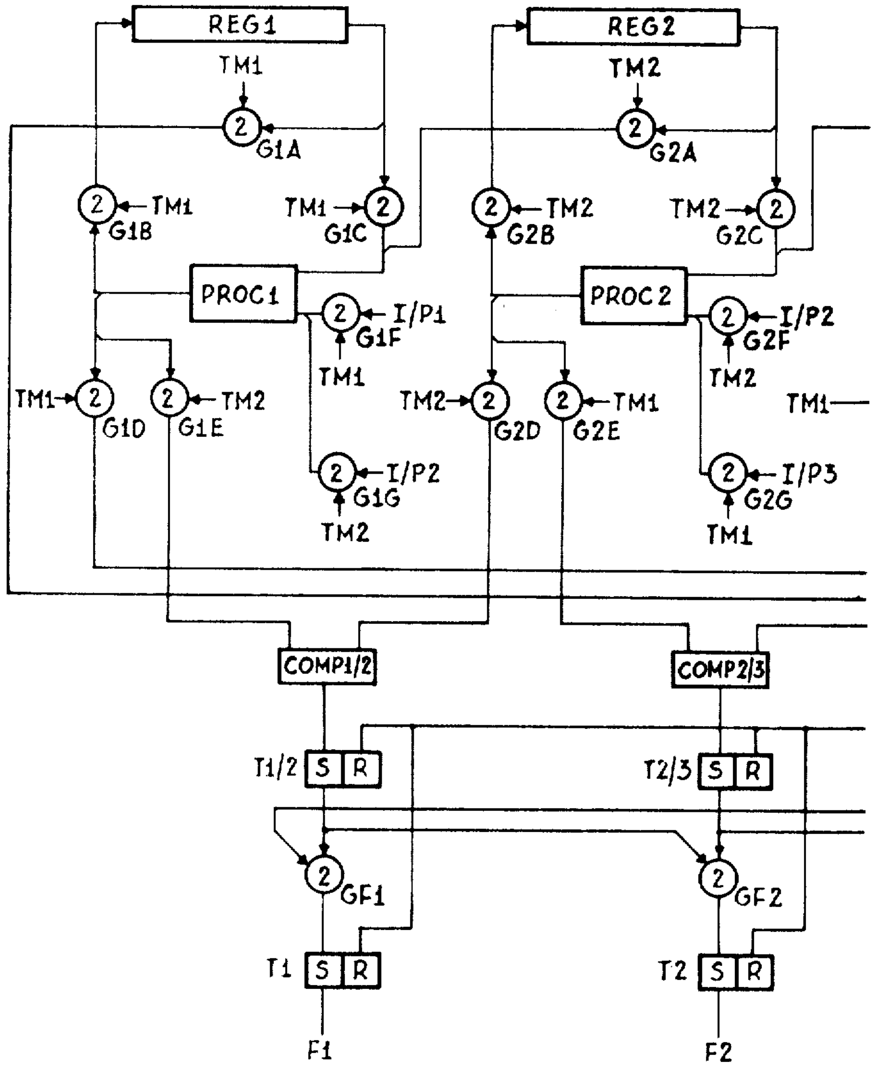
Figure 2:
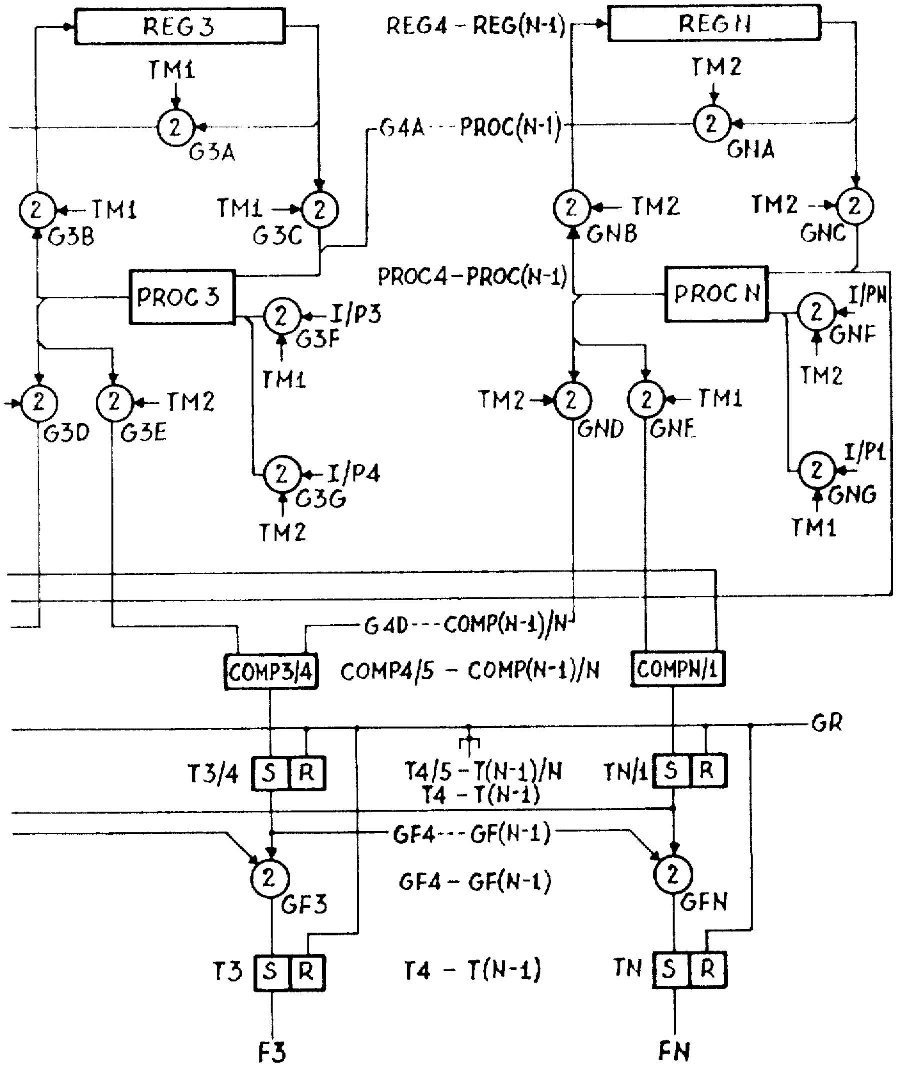

The invention will be better understood from the following description of one embodiment read in conjunction with the accompanying drawings comprising FIGS. 1 and 2 which illustrate a logic circuit diagram incorporating processing arrangements for processing data to and from register stores and also incorporates logic circuitry in accordance with the present invention.

Before embarking upon a description of the circuit diagram illustrated in FIG. 1 and FIG. 2, which should be placed side-by-side with FIG. 1 to the left of FIG. 2, consideration will first be given to the symbols shown therein. Referring then to the rectangular blocks designated REG1, REG2, REG3 ... REGN, these represent a plurality of multistage shift registers of known type, each register employing a suitable bistable device in each stage. The rectangular blocks designated PROC1, PROC2, PROC3 ... PROCN represent a plurality of processors each of which is provided with the necessary logic circuitry for handling input data and processing the input data to and from its associated shift register. Further the rectangular blocks designated COMP1/2, COMP2/3, COMP3/4 ... COMPN/1 represent comparator circuits of the nonequivalence type with perform an EXCLUSIVE-OR function, in which a significant output is only forthcoming at the output of the circuit when there is a significant signal present on either one or other of its two inputs. In the circuit illustrated, each comparator compares the outputs of adjacent processors and only produces a significant output when these outputs are at variance.

The remaining rectangular boxes designated T1/2, T2/3, T3/4 ... TN/1 and T1, T2, T3 ... TN, and which are divided into two portions designated S and R, represent bistable devices typically comprising a pair of cross-coupled transistors. As is well known, the bistable device has two stable states and in the circuit diagram, for each bistable device, these two states are represented by the symbol S for the so-called "set" state and the symbol R for the so-called "reset" state. In operation, taking any bistable as an example, if the bistable is considered to be in its "reset" state, a significant output will be present at the output (the outputs are located on the lower part of the symbol) of the "reset" R side of the bistable only. If now a significant signal is applied to the input (the inputs are located on the upper part of the symbols) of the "set" S side of the bistable, a transposition of states will occur and a significant output signal will now appear at the output of the "set" S side of the bistable only. To cause a further transposition of states to the "reset" R state a significant signal is applied to the input of the "reset" R side of the bistable whereupon the bistable becomes transposed and a significant output signal appears at the "reset" R side of the bistable only. In the circuit illustrated in the diagram, only the "set" outputs of the bistables are utilized.

The remaining symbols, comprising a circle enclosing the numeral 2 and each having two inputs, shown by the arrowed leads, and a single output, shown by the lead without the arrow, represent gate circuits of the type which perform an AND function, i.e. only when significant signals occur concurrently on the two inputs does a significant signal occur at the output. These gate circuits are typically of the diode/resistor type.

It will be noted that of the plurality of arrangements of N registers and their associated processors and circuitry only four such arrangements are shown and these are those comprising register REG1 with processor PROC1, register REG2 with processor PROC2, register REG3 with processor PROC3 and register REGN with processor PROCN. Register REG4 with processor PROC4 to register REG(N−1) with processor PROC(N−1) are not shown for the sake of simplicity, but it should be appreciated that these registers and processors are connected in a manner similar to the corresponding registers and processors which are shown. Similarly with regard to the circuitry concerned with fault indication and identification only comparators COMP1/2, COMP2/3, COMP3/4, and COMPN/1 and associated bistable devices T1/2, T2/3, T3/4 and TN/1 respectively and T1, T2, T3 and TN respectively in addition to gates GF1, GF2, GF3 and GFN respectively are shown. Comparators COMP4/5 to COMP(N−1)/N and their associated bistable devices T4/5 to T(N−1)/N respectively and T4 to T(N−1) respectively in addition to gates GF4 to GF(N−1) respectively are not shown for the sake of simplicity but it should be understood that these bistable devices and gates are connected in a manner similar to the corresponding bistable devices and gates which are shown.

The arrangement of the complete circuit is such that the individual similar portions of circuitry, for instance each processor with its associated register and logic circuitry such as processor PROC1 and register REG1 together with gates G1A, GIB ... G1G, and each fault-indication and identification circuits such as that comprising comparator COMP1/2, bistable T1/2, gate GF1 and bistable T1, are interconnected in such a manner that a so-called "ring" is formed, with the individual circuits in the "ring" which are nominated as the first individual circuits, being connected to the respective second individual circuits and these being so connected to the respective third individual circuits and so on through the other individual circuits to the respective last individual circuits which are connected to the respective first individual circuits, the rotation being taken in a clockwise direction.

Dealing with these interconnections in ore detail, firstly attention is drawn to the interconnections between the output of each register and the input of its immediately preceding processor. These interconnections arrange for the output data from each register to be passed to the input of the immediately preceding processor in one of two specific periods or phases upon the closure of the appropriate gate circuits (appropriate ones of gates G1A, G2A, G3A ... GNA) for processor arrangement checking purposes. To effect these two specific periods or phases, two separate successive pulses of equal duration and designated TM1 and TM2 are provided. In the first period, pulse TM1 is used, amongst other things, to gate the output data from each odd register to the input of an even processor whereas in the second period, pulse TM2 is used, amongst other things, to gate the output data from each even register to the input of an odd processor.

Secondly, attention is drawn to the interconnections between adjacent fault indication and location circuits. These extend from the "set" S output of the bistable, on the output of the comparator of one individual circuit, to an input of an AND gate in the succeeding individual circuit. For instance from the "set" S side of bistable T1/2 connection is made to an input of ate GF2; the output of the "set" S side of bistable T2/3 is connected to an input of gate GF3 and so on in similar manner between the succeeding individual circuits until finally the output of the "set" S side of bistable TN/1 is connected to an input of gate GF1.

Before describing the operation of the circuit arrangement in detail, it is important to appreciate several points of particular significant which enable the satisfactory functioning of the present circuit arrangements. It should be appreciated from the following description that the method of processor arrangement checking, fault indication and processor identification is the so-called triplication method. However, instead of using additional processors for these purposes, which are in effect redundant apart from their checking function, spare time is utilized on the normal number of processors which are provided for the processing of data. For the letter method to be realized each processor must have the ability to deal with more processing than is actually required for the specific application. In the present case each processor is capable of processing more registers than are required. In addition, with respect to the two phases of operation in relation to the odd and even processors and the pulse TM1 and TM2 related to this operation, the total period of these two pulses together must not exceed the shortest period between significant pulses of information contained within the input data, otherwise some of this data may be missed. Finally, the quantity of processing arrangements in association with fault-indication and processor arrangement identification circuits necessary for checking, fault-indicating and processor arrangement identification purposes will always be an even number but never less than four. This point will become clear from the following description of the operation of the circuit arrangement.

Consideration will now be given to the operation of the circuit arrangements in the first phase of operation It is assumed that all the bistable devices T1/2, T2/3, T3/4 ... TN/1 and T1, T2, T3 ... TN have been "reset" by the application of a suitable pulse to the conductor designated GR. Now, upon the occurrence of pulse TM1, each odd-numbered processor is caused to process its own associated register. Processor PROC1 inputs to register REG1 by way of gate G1B and this register returns an output to PROC1 by way of gate G1C. Both gates G1B and G1C are primed by pulse TM1 as is gate G1F which permits new input-data to enter processor PROC1 by way of the lead designated I/P1. Each remaining odd numbered processor processes its own associated odd-numbered register, by way of gates corresponding to gates G1B and G1C, the new input-data being presented to the gates corresponding to gate G1F. For instance, in the case of processor PROC3 its output is fed by way of gate G3B to the input of register REG3 and the output of this register is returned to the input of the processor by way of gate G3C. New input-data is presented to processor PROC3 by way of the lead designated I/P3 and gate G3F.

Each odd-numbered register also outputs into its immediately preceding even-numbered processor, for instance, in the case of registers REG1 and REG3 to processors PROCN and PROC2 respectively by way of gates G1A and G3A respectively which are both primed by pulse TM1. Similarly each of the remaining odd-numbered processors outputs into its immediately even-numbered preceding processor by way of gates corresponding to G1A and G3A. The output of each odd-numbered processor and its immediately preceding even-numbered processor are now compared. For instance, the output from processor PROC3 is directed by way of gate G3D, which is primed by pulse TM1, to one input of the comparator COMP2/3, whereas the output of processor PROC2 is fed by way of gate G2E, which is also primed by pulse TM1, to the other input of the comparator COMP2/3. Likewise, the output from processor PROC1 is fed by way of gate G1D, which is primed by pulse TM1, to one input of comparator COMPN/1, whereas the output of processor PROCN is fed by way of gate GNE, which is primed by pulse TM1, to the other input of comparator COMPN/1. The outputs from the remaining odd- and even-numbered processors are fed by way of gates corresponding to G3D together with G2E respectively and gates G1D together with GNE respective to comparators corresponding to comparators COMP2/3 and COMPN/1 respectively.

At this juncture it is important to appreciate that each processor, besides having the output of the immediately succeeding register presented to an input thereof, has in addition new input-data, that is presented directly to the immediately succeeding processor, also presented to it. For example, processor PROC1 has input I/P2 gated with pulse TM2 at gate G1G, to present the same new input-data concurrently to processor PROC1 as that presented to processor PROC2. Likewise, processor PROC2 has input I/P3 gated with pulse TM1 at gate G2G, to present the same new input-data concurrently to processor PROC2 as that presented to processor PROC3. Similarly each of the remaining processors PROC3 to PROCN has the same new input-data presented to it concurrently as that presented to the immediately succeeding processor, by way of gates corresponding to gates G1G and G2G. These particular arrangements ensure that if new input-data enters any processor, the immediately preceding processor is updated with this new input-data so that providing the processors, whose outputs are presently being compared, are functioning correctly, no disparity is indicated between the inputs of any of the appropriate comparators e.g. COMP1/2, COMP2/3, COMP3/4, COMPN/1 and so on.

Without the foregoing arrangement, disparity would occur between the inputs of the appropriate comparators when new input-data is presented to any processor since this new input-data would not be presented to the immediately preceding processor until the data had been processed through the register associated with the processor receiving this new input-data, and accordingly a delay in presentation of this new input-data to the immediately preceding processor would be encountered as a result of which differing processor outputs would be applied to the appropriate comparator.

If it is now considered that during normal processing procedure in the first phase of operation, one of the processors does not function correctly say, for example, processor PROC1, then since the output of this processor is being compared with the output of processor PROCN a disparity occurs between the two processor outputs and, therefore, also between the inputs of comparator COMPN/1 which immediately gives a significant output that "sets" bistable TN/1. As far as comparator COMPN/1 is concerned this item of equipment only registers a disparity between the outputs of processors PROC1 and PROCN, but is not able to identify which processor is at fault. Accordingly, the output of comparator COMP/1 primes gates GFN and GF1 in preparation for the "setting" of either bistable TN or T1 respectively in the second phase of operation of the circuit.

Upon the termination of pulse TM1, the first phase of operation of the circuit is complete and the second phase of operation of the circuit commences upon the occurrence of pulse TM2. During the second phase of operation, each even-numbered processor processes its own associated register. For instance, processor PROC2 inputs to register REG2 by way of gate G2B, which is primed by pulse TM2, and register REG2 outputs into processor PROC2 by way of gate G2C, which is also primed by pulse TM2. Gate G2F is also primed by pulse TM2 and permits new input-data to enter processor PROC2 by way of the lead designated I/P2. Likewise, processor PROCN outputs into register REGN by way of gate GNB, which is primed by pulse TM2, and register REGN outputs into processor PROCN by way of gate GNC which is also primed by pulse TM2. New input-data is presented to processor PROCN over the conductor designated I/PN and gate GNF which is primed by pulse TM2. Each remaining even-numbered processor processes its own associated even-numbered register by way of gates corresponding to gates G2B together with G2C and gates GNB together with GNC. New input-data to these remaining even-numbered processors is presented by way of gates corresponding to G2F and GNF.

Each even-numbered register also outputs into its immediately preceding odd-numbered processor, for instance in the case of registers REG2 and REGN to processors PROC1 and PROC(N−1) (not shown) respectively by way of gates G2A and GNA respectively, which are both primed by pulse TM2. Similarly each of the remaining even-numbered processors outputs into its immediately preceding odd-numbered processor by way of gates corresponding to G2A and GNA. The output of each even-numbered processor and its immediately preceding odd-numbered processor are now compared. For instance, the output from processor PROC2 is directed by way of gate G2D, which is primed by pulse TM2, to one input of the comparator COMP1/2, whereas the output of processor PROC1 is fed by way of gate G1E, which is also primed by pulse TM2, to the other input of comparator COMP1/2. Likewise, the output from processor PROCN is fed by way of gate GND, which is also primed by pulse TM2, to one input of comparator COMP(N−1)/N (not shown), whereas the output of processor PROC(N−1) (not shown) is fed by way of gate G(N−1)E (not shown) to the other input of comparator COMP(N−1)/N. The outputs from the remaining even- and odd-numbered processors are fed by way of gates corresponding to G2D together with G1E respectively and gates GND together with G(N−1)E (not shown) to comparators corresponding to comparators COMP1/2 and COMP(N−1)/N (not shown) respectively.

Each odd-numbered processor, besides having the output of the immediately succeeding even-numbered register fed to an input, has in addition new input-data that is fed to it and is also fed directly to the immediately succeeding even-numbered processor. For example, processor PROC1 has input I/P2 gated with pulse TM2 at gate G1G to present the same new input-data to this processor as that presented to processor PROC2. Similarly, processor PROC(N−1) (not shown) and the other remaining odd-numbered processors which are not shown, each have the same new input-data, that is fed to the respective immediately succeeding even-numbered processors, fed to them by way of gates corresponding to gate G1G. In the manner similar to the first phase of operation of the circuit, each processor being fed with data from the immediately succeeding register is ensured of being updated with the same new input-data which is being fed to the processor controlling the succeeding register. The reason for this particular arrangement is similar to that previously described in the first phase of operation of the circuit.

It will be recalled that during the first phase of operation it was considered that processor PROC1 did not function correctly and because of this a disparity was registered between the outputs of processor PROC1 and processor PROCN by comparator COMPN/1. The output of comparator COMPN/1 "ste" bistable TN/1 and the "set" S output of this primed gates GF1 and GFN in preparation for the opening of an appropriate one of these gates to "set" bistable T1 or TN in the second phase of operation according to which of processors PROC1 and PROCN is not functioning correctly. Accordingly, because by the operation of bistable TN/1 during the first phase of operation an indication is given that either processor PROC1 or PROCN is not functioning correctly, in the second phase of operation a check is now made to determine exactly which of these processors is at fault. To determine this, the output of processor PROCN is compared with the output of processor PROC(N−1) (not shown) by comparator COMP(N−1)/N (not shown) and the output of processor PROC1 is compared with the output of processor PROC2 by comparator COMP1/2. As previously processor PROC1 was nominated as being faulty there will be a disparity between the outputs of processors PROC1 and PROC2, so comparator COMP1/2 will give a significant output which will "set" bistable and S output of this bistable now opens gate GF1, which has been previously primed from the "set"S output of bistable TN/1, and the output of gate GF1 now "sets" bistable T1 which duly gives a significant output on conductor F1 to identify which processor is at fault. The output on conductor F1 can be used to actuate a fault printout and/or busying out of the faulty processor.

Faults occurring on other processors are detected and identified in a manner similar to that just described for processor PROC1 i.e. during the first phase of operation, each odd-numbered processor processes its own associated register and the output of each odd-numbered processor is compared with the output of its immediately preceding even-numbered processor, and then if a disparity occurs between any two outputs being compared, the bistable device associated with the comparator indicating the disparity is "set." Further, the output from this bistable primes two gates which are directly associated with two further bistable devices, either of which, when "set," identifies the faulty processor. However, neither of these bistables can "set" until two further comparisons of the outputs of certain processors have been examined. These comparisons take place during the second phase of operation when each even-numbered processor processes its own associated register and the output of each even-numbered processor is compared with the output of its immediately preceding odd-numbered processor. A disparity now occurs between the faulty processor, of the two processors whose outputs were compared in the first phase of operation, and the processor whose output it is now compared with. As a result the appropriate one of the two gates previously primed is now opened and the further bistable corresponding to the faulty processor is "set" to give a significant output to identify the faulty processor. The application of a suitable pulse to conductor GR later, after the fault has been recorded and rectified, will "reset" any bistable devices which have been "-det" during the operating sequence.

It will be appreciated by those skilled in the art that although each processor is shown associated with one register only, by judicious arrangement of the circuit a plurality of registers can time share one processor so that each register can in effect be processed in turn by that processor during the processing cycles i.e. during the first and second phases of operation. Say, for instance, that eight registers are provided for each processor, then the output from the relevant processor is gated with either TM1, for registers associated with odd-numbered processors, or with pulse TM2, for registers associated with even-numbered processors, and also, to provide an input to each different register, with a different pulse of eight successive pulses of equal duration and in total duration equal to the duration of pulse TM1 or TM2. The individual outputs of the registers are gated similarly to the individual inputs and are combined in a single OR gate (when anyone significant input or more than one significant input is/are present on the gate at any one time a significant output is produced), the output of which is returned to the input of the associated processor.

Where more than one register is processed by a single processor, two phases of operation are employed, one phase for processing successively all the registers associated with odd-numbered processors and for making operational checks concurrently against the preceding even-numbered processors, and the other phase for processing successively all the registers associated with even-numbered processors and for making operational checks concurrently against the preceding odd-numbered processors. There is, however, an alternative method of operation which is to commence the sequence of operations by processing the first register associated with each odd-numbered processor, while operational checks are made concurrently against preceding even-numbered processors, and then to process the first register associated with each even-numbered processor, while operational checks are made concurrently against preceding odd-numbered processors. The sequence is continued, processing alternately a register associated with each odd-numbered processor, followed by processing a register associated with each even-numbered processor until all the registers have been processed and their associated processors checked for correct operation.

This alternative method does not necessitate any alteration in the circuit as shown, apart from the provision of suitable gating arrangements required for each processor to process eight registers each on a time-sharing basis, but does require the timing of the phase pulses to be changed. Accordingly, the frequency of pulses TM1 and TM2 is increased and the duration of each pulse pulse is decreased such that each pulse is equal to the processing period of a register. In addition, because of the new phase pulse timing arrangements, instead of there being eight different successive pulses for register selection, 16 different successive pulses are provided. The operational sequence in this arrangement is then as illustrated in table 1 in which is represented 16 register selection pulses 1 to 16 and phase pulses TM1 and TM2. Although the phase pulses are shown in the table they are not utilized in the selection of the respective registers but it should be understood that during the occurrence of phase pulse TM1 the registers associated with odd processors are processed, whereas during the occurrence of phase pulse TM2 the registers associated with even processors are processed. Each register selection pulse, when combined with the appropriate register output, in suitable gating arrangements, selects for processing the respective registers indicated in the body of the table Table 1

| Register-selecting pulse | Registers selected for processing during the occurrence of phase pulses: TM1 | TM2 |
|---|---|---|
| 1 | REG1/ODD | |
| 2 | | REG1/EVEN |
| 3 | REG2/ODD | |
| 4 | | REG2/EVEN |
| 5 | REG3/ODD | |
| 6 | | REG3/EVEN |
| 7 | REG4/ODD | |
| 8 | | REG4/EVEN |
| 9 | REG5/ODD | |
| 10 | | REG5/EVEN |
| 11 | REG6/ODD | |
| 12 | | REG6/EVEN |
| 13 | REG7/ODD | |
| 14 | | REG7/EVEN |
| 15 | REG8/ODD | |
| 16 | | REG8/EVEN |

For instance, register selecting pulse 1, during the occurrence of phase pulse TM1, selects register REG1/ODD for processing and this designation represents the first register in a group of registers associated with an odd-numbered processor, whereas register-selecting pulse 2, during the occurrence of phase pulse TM2, selects register REG1/EVEN for processing and this designation represents the first register in a group of registers associated with an even-numbered processor. Similarly, the registers designated REG2/ODD to REG8/ODD in the table representing registers associated with an odd-numbered processor and the registers designated REG2/EVEN to REG8/EVEN in the table representing registers associated with an even-numbered processor are each selected for processing purposes by an appropriate en of the register-selecting pulses and the relevant register output during the occurrence of an appropriate one of the phase pulses.

The arrangements for processor checking and processor identification in the event of a fault arising are as already described, i.e. during the occurrence of phase pulse TM1 when registers associated with odd-numbered processors are being processed, an operational check is also made against the immediately preceding even-numbered processors to detect if any processor is not functioning correctly, and then upon the termination of phase pulse TM1, phase pulse TM2 occurs during which period the even-numbered processors are processed and an operational check is also made against the immediately preceding odd-numbered processors in order to identify the faulty processor, if such a processor is detected during the occurrence of phase pulse TM1.

Further alternative arrangements of operation involving either different pulse timing arrangements or different gating arrangements, or both these arrangements together will be apparent to those skilled in the art and therefore the present embodiment and is described alternative are not intended to limit the scope of the invention.

A further alternative to the specific circuit arrangements shown will be apparent to those skilled in the art, involving the advancement of data from the output of any register to the immediately succeeding processor, for checking purposes, instead of the immediately preceding processor. Further modifications to the circuit arrangement that are required to put this alternative arrangement into effect are firstly, that gate circuits controlling the outputs from the processors to the comparator circuits presently having pulse TM1 applied to them have pulse TM2 applied to them instead, whereas those gate circuits presently having pulse TM2 applied to them have pulse TM1 applied to them instead. Secondly, the gate circuits such as G1G, G2G, G3G and so on to gate GNG which presently control new input-data from the immediately succeeding processor are arranged to control new input-data from the immediately preceding processor. The circuit now operates in a manner substantially as that already described.

We claim:

1. In a data processing arrangement a checking and fault-indicating arrangement associated with an even number of processors, at least four, comprising a first group of processors, a second group of processors equal in number of said first group of processors, means effective during a first predetermined period for controlling each of the processors of said first group to perform a processing operation, means effective during said first predetermined period for applying the data applied for processing to a processor of said first group to a particular processor of said second group, means effective during a second predetermined period for controlling each of the processors of said second group to perform a processing operation, means effective during said second predetermined period for applying the data applied for processing to a second processor of said second group to said processor of said first group, a first comparator individual to said processor of said first group and to said particular processor of said second group, means effective during said first predetermined period for applying the outputs of said processor of said first group and said particular processor of said second group to said first comparator, a second comparator individual to said processor of said first group and said second processor of said second group, means effective during said second predetermined period for applying the outputs of said processor of said first group and said second processor of said second group to said second comparator whereby a significant output is obtained from said first and said second comparators if said processor of said first group is faulty and an indicating arrangement to which the significant outputs of said first and second comparators are applied and which give an indication of the faulty processor.

2. A checking and fault-indicating arrangement as claimed in claim 1, wherein the outputs of said second processor of said second group and a second processor of the first group are applied to a third comparator individual to said two processors during a predetermined period succeeding said second predetermined period and corresponding to said first predetermined period and if said second processor of said second group is faulty, and significant outputs of said second and third comparators applied to said indicating arrangement will identify the faulty processor.

3. A checking and fault-indicating arrangement as claimed in claim 1, wherein the processors are arranged in a ring formation and the first group of processors are the odd-numbered processors in the ring and the second group are even-numbered processors, the data applied for processing to an odd-numbered processor during the first predetermined period being also applied to the immediately preceding even-numbered processor in the ring whereas the data applied for processing to the immediately succeeding even-numbered processor in the ring during the second predetermined period is also applied to said odd-numbered processor.

4. A checking and fault-indicating arrangement as claimed in claim 3, wherein a shift register is associated with each one of the processors and gating arrangements are provided which enable the output of a shift register to be gated into the associated processor and into the immediately preceding processor in the ring during one of the predetermined periods.

5. A checking and fault-indicating arrangement as claimed in claim 4, wherein gating arrangements are provided for updating during said first predetermined period the data applied to a processor from its associated shift register and for updating during said second predetermined period the data applied to said processor from the shift register associated with the immediate succeeding processor in the ring.

6. A checking and fault-indicating arrangement as claimed in claim 1, wherein said indicating arrangement comprises two two-state switching devices for each comparator, the switching devices having set and reset sides and a significant output from a comparator sets the first of the associated switching devices, the set output of said first comparator and the set output of said second comparator being applied to an AND circuit, the output of which sets the second of the associated switching devices, the set output of which identifies the faulty processor.

* * * * *